United States Patent
Le Van Suu

(10) Patent No.: US 6,356,623 B1
(45) Date of Patent: Mar. 12, 2002

(54) METHOD FOR COMMUNICATING ON AN EQUIPMENT NETWORK

(75) Inventor: Maurice Le Van Suu, Savigny Le Temple (FR)

(73) Assignee: STMicroelectronics, Gentilly (FR)

( * ) Notice: Subject to any disclaimer, the term of this patent is extended or adjusted under 35 U.S.C. 154(b) by 35 days.

(21) Appl. No.: 09/586,315

(22) Filed: Jun. 2, 2000

(30) Foreign Application Priority Data

Jun. 4, 1999 (FR) .............................................. 99 07110

(51) Int. Cl.$^7$ .............................. H04M 1/24; H04M 1/00

(52) U.S. Cl. .............................. 379/24; 379/4; 379/348; 379/390.01

(58) Field of Search ............................ 379/1.01, 4, 22, 379/22.02, 23, 24, 32.01, 32.02, 32.04, 347, 341, 340, 343, 348, 388.06, 390.01, 395, 395.01

(56) References Cited

U.S. PATENT DOCUMENTS

| | | | |
|---|---|---|---|
| 4,317,010 A | | 2/1982 | Fillot ........................ 370/243 |
| 5,408,348 A | | 4/1995 | Pamart et al. ............... 359/110 |
| 6,061,427 A | * | 5/2000 | Ryoo ............................. 379/1 |
| 6,067,458 A | * | 5/2000 | Chen ........................... 455/522 |
| 6,226,356 B1 | * | 5/2001 | Brown ......................... 379/24 |

FOREIGN PATENT DOCUMENTS

WO        WO 97/24858       7/1997    ............ H04M/3/40

* cited by examiner

*Primary Examiner*—Binh Tieu
(74) *Attorney, Agent, or Firm*—Lisa K. Jorgenson; Stephen Bongini; Fleit, Kain, Gibbons, Gutman & Bongini, P.L.

(57) ABSTRACT

A method is provided for communicating on an equipment network. According to the method, a message is sent from a sending equipment unit to a receiving equipment unit as a signal having a nominal power. Whenever the signal is amplified by an intermediate equipment unit through which the signal passes, the message is modified to indicate that the signal has been amplified by the intermediate equipment unit. Also provided is a first equipment unit for connection to an equipment network. The first equipment unit includes a receiver for receiving a signal that was sent by a sending equipment unit at a nominal power level, means for measuring data representative of a quality of the received signal, means for comparing the measured data with a first threshold, means for amplifying the signal when the measured data is below the first threshold, means for modifying a message carried by the signal so as to indicate that the signal has been amplified whenever the signal is amplified by the means for amplifying, and a transmitter for sending the signal on to a receiving equipment unit. Additionally, there is provided a message that includes an information word having a value that indicates the number of times that the signal containing the message has been amplified by intermediate equipment units located on an network between sending and receiving equipment units.

21 Claims, 2 Drawing Sheets

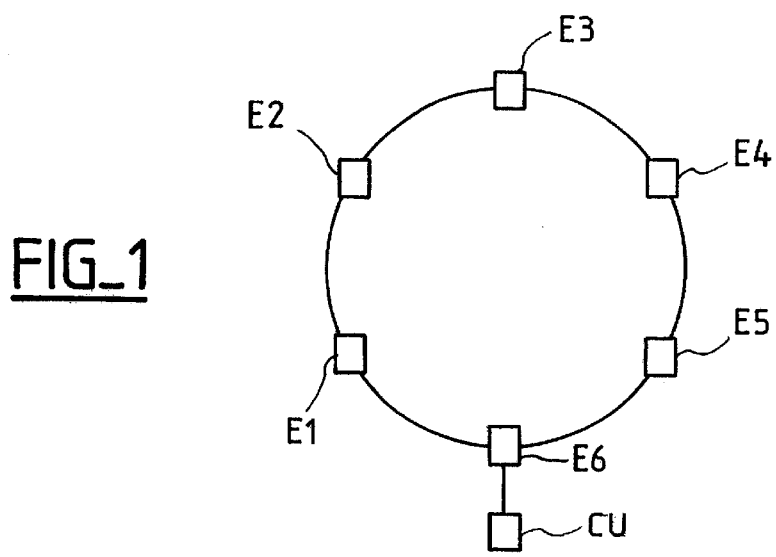
FIG_1
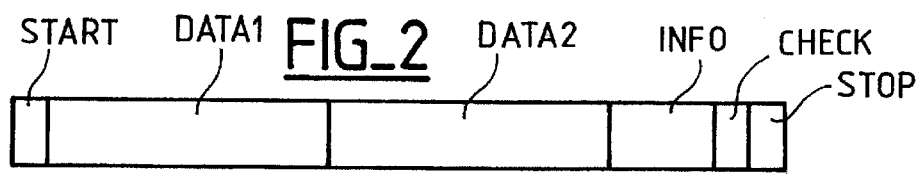
FIG_2
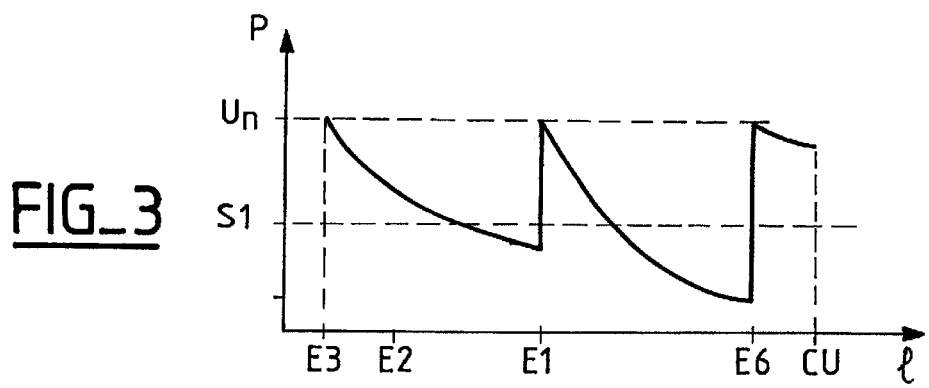
FIG_3
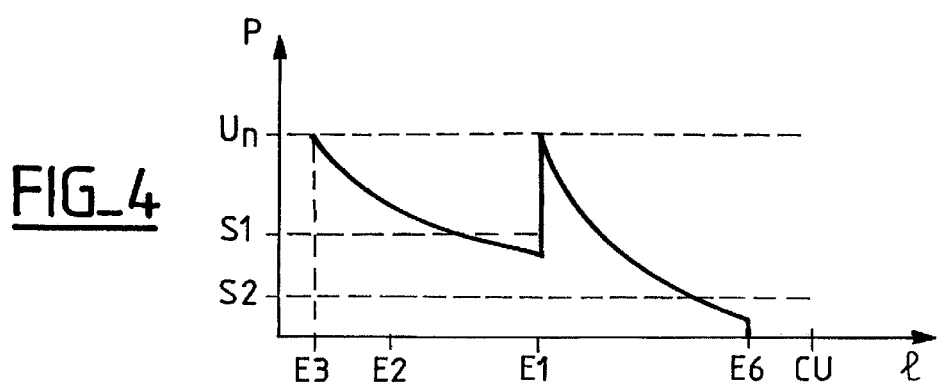
FIG_4

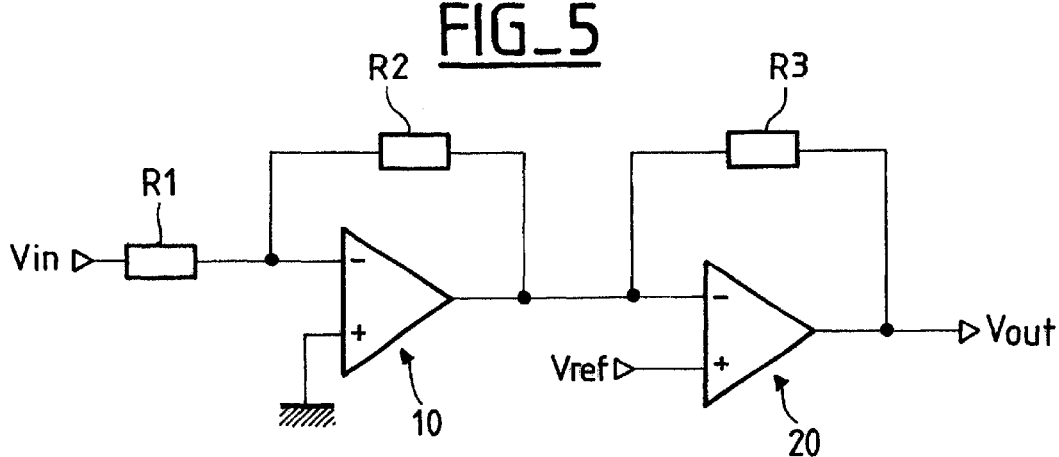
FIG_5
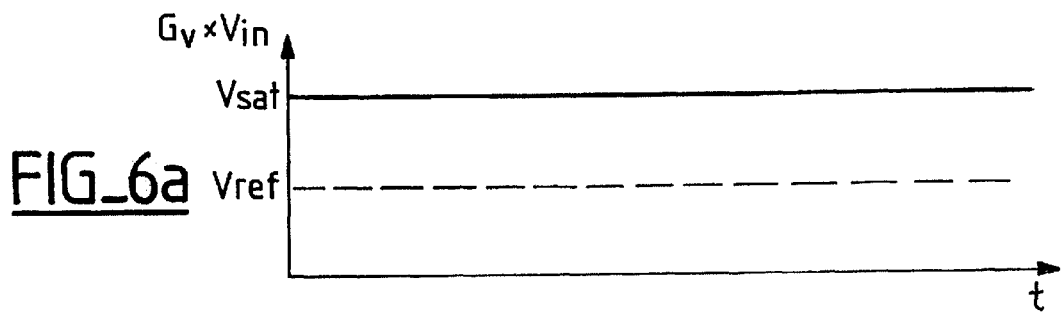
FIG_6a
FIG_6b
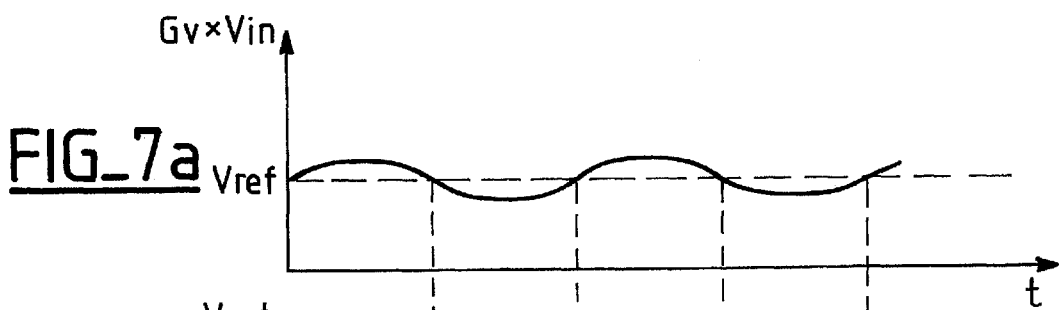
FIG_7a
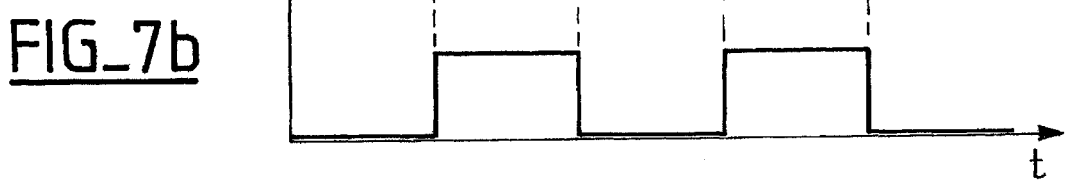
FIG_7b

METHOD FOR COMMUNICATING ON AN EQUIPMENT NETWORK

CROSS-REFERENCE TO RELATED APPLICATIONS

This application is based upon and claims priority from prior French Patent Application No. 99-07110, filed Jun. 4, 1999, the entire disclosure of which is herein incorporated by reference.

BACKGROUND OF THE INVENTION

1. Field of the Invention

The present invention relates to equipment networks, and more specifically to methods for communicating on an equipment network.

2. Description of Related Art

An equipment network is an arbitrary group of equipment units that are connected together by any link so as to allow the exchange of information messages, control messages, and/or energy. The equipment units can be domestic appliances in a home management network, computers in a data processing network, urban equipment such as street lights that are connected to a control center, meteorological recording units, telephone repeaters, television repeaters, or the like. The linking equipment can be a LAN-type current carrier computer network (local area network), a coaxial cable or fiber-optic network, or air or another physical medium when transmitting through electromagnetic waves (e.g., using radio frequency or optical transmission).

Conventionally, there are two types of networks that can be distinguished as a function of the spatial arrangement of the equipment. First, there are "standardized" networks in which the distance separating two equipment units in the network is known during equipment design and installation. For example, this is the case in a network of line repeaters for sending long distance telephone signals. The repeaters are separated from one another by a constant or approximately constant distance. Additionally, there are "non-standardized" networks in which the distance separating two equipment units is not defined in advance. For example, this is the case in a network of domestic appliances connected in a ring inside a home. The journey of the exchanged messages and the distance traveled by these messages between two equipment units are not known during equipment manufacture and/or network installation.

FIG. 1 is a diagram showing a network of equipment units E1 to E6 that are configured in a ring and connected through linking means LT to each other and to a specialized equipment unit CU that is a control unit. The network is a nonstandardized network in which the distance between two equipment units E1–E6 and between the equipment units E1–E6 and the control unit CU is unknown. The messages sent by one equipment unit (i.e., the sending unit) to another equipment unit (i.e., the receiving unit) are sent in the form of a signal such as a modulated electrical signal.

In such a non-standardized network, the messages are sent with a nominal power level $U_n$ that is independent of the distance separating the sending unit from the receiving unit. The value of $U_n$ is limited by considerations concerning economic electrical power consumption, power supply capabilities of the sending unit, and electromagnetic compatibility (e.g., a signal, whatever its nature, cannot legally be sent at a very high power without conforming to standards that are established to protect other electrical or electronic devices operating in the same geographical area).

In the network of FIG. 1, a message from equipment unit E3 to the control unit CU passes through equipment units E2, E4, and E6. Because of the attenuation on the linking means, the power level of the signal decreases as the signal advances along the network. For example, the signal may be $0.90 \times U_n$ at equipment unit E2, $0.60 \times U_n$ at equipment unit E1, $0.40 \times U_n$ at equipment unit E6, and finally $0.25 \times U_n$, when it arrives at the control unit CU. Additionally, because of interference effects suffered by signals on the linking means LT, the power level of the signal that is received by the receiving unit may be insufficient for an error-free decoding of the message. In other words, the message may suffer from interference before being received by the receiving unit due to electromagnetic perturbations or the like along the linking means. A similar problem arises in standardized networks when signal attenuation on the linking means varies in an uncontrolled manner.

To overcome this problem, it has been proposed to amplify the signal bearing the transmitted message one or more times (depending on specific requirements) between the sending unit and the receiving unit. This is the principle of signal repeaters. Such an approach improves the signal-to-noise ratio SNR, which is the ratio of the signal power level to the noise power level. In standardized networks, amplification is typically selective insofar as it is only carried out when necessary (i.e., when the power level of the signal received by a given equipment unit during transmission toward the receiving unit, possibly via another intermediate equipment unit, is below a threshold).

However, a drawback exists because this can cause the signal level received by the receiving unit to be relatively high, even though previously in the transmission process the signal level was very low, possibly even close to the noise floor. Thus, despite the fact that the receiving unit sees such a high level, the received message is still susceptible to having been corrupted during transmission. In other words, the fact that the signal was previously amplified so that it is received by the receiving unit at a power level that is not far from $U_n$ can mask the risk of corruption in the received message.

SUMMARY OF THE INVENTION

In view of these drawbacks, it is an object of the present invention to overcome the above-mentioned drawbacks and to provide a method for communicating on an equipment network through linking means. A message sent from one equipment unit to another equipment unit as a signal having a nominal power is selectively modified in order to indicate when the signal has been amplified by an intermediate equipment item through which the signal passes. Thus, when received by the receiving equipment unit, the message carries an indication of whether a signal amplification has taken place during transit. This can be used as an indirect indication that the message may have been corrupted so as to contain errors.

One embodiment of the present invention provides a method for communicating on an equipment network through linking means. The equipment network includes equipment units, at least some of which are able to send and/or receive messages. According to the method, a message is sent from a sending equipment unit to a receiving equipment unit as a signal having a nominal power. Whenever the signal is amplified by an intermediate equipment unit through which the signal passes, the message is modified to indicate that the signal has been amplified by the intermediate equipment unit. In a preferred method, the message is modified by incrementing the value of an information word of the message.

Another embodiment of the present invention provides a first equipment unit for connection to an equipment network that connects the first equipment unit and other equipment units through linking means. The first equipment unit includes a receiver for receiving a signal that was sent by a sending equipment unit at a nominal power level, means for measuring data representative of a quality of the received signal, means for comparing the measured data with a first threshold, means for amplifying the signal when the measured data is below the first threshold, means for modifying a message carried by the signal so as to indicate that the signal has been amplified whenever the signal is amplified by the means for amplifying, and a transmitter for sending the signal on to a receiving equipment unit. In one preferred embodiment, the means for comparing also compares the measured data with a second threshold, and the transmitter does not send the signal on to the receiving one of the equipment units when the measured data is below the second threshold.

Yet another embodiment of the present invention provides a message that is sent as a signal from a sending equipment unit of an equipment network to a receiving equipment unit of the equipment network. The message includes an information word having a value that indicates the number of times that the signal has been amplified by intermediate equipment units located on the network between the sending equipment unit and the receiving equipment unit. In a preferred embodiment, the message also includes at least one word that identifies which intermediate equipment units have amplified the signal.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 1 is a diagram of an equipment network in a ring configuration;

FIG. 2 shows a message format according to a preferred embodiment of the present invention;

FIG. 3 is a graph illustrating a communication method according to a first embodiment of the present invention;

FIG. 4 is a graph illustrating a communication method according to a second embodiment of the present invention;

FIG. 5 is a diagram of a circuit that is included in an equipment unit in accordance with a preferred embodiment of the present invention;

FIGS. 6a and 6b are timing diagrams showing signals from the circuit of FIG. 5 in one case; and FIGS. 7a and 7b are timing diagrams showing signals from the circuit of FIG. 5 in another case.

DETAILED DESCRIPTION OF PREFERRED EMBODIMENTS

Preferred embodiments of the present invention will be described in detail hereinbelow with reference to the attached drawings. While the following description relates to an exemplary network that connects urban street lights to each other and to a control center located substantially at the center of the town, the present invention is not so limited. The principles of the present invention can be applied to any equipment network.

With reference to FIG. 1, the exemplary network includes equipment units El to E6 in the form of street lights and a control unit CU in the form of a street light control center. The street lights E1–E6 and the control center CU are interconnected by linking means LT such as coaxial cables or the like to allow messages to be exchanged between the street lights and the control center. In the exemplary embodiment of FIG. 1, the network is a ring network. However, in further embodiments, the network is a star network or any other type of network.

The control center CU sends messages to the street lights E1–E6 to control their switching on when night falls and their switching off at daybreak. One or more ambient light detectors (not shown) are provided for this purpose (for example, at the control center). Preferably, the street lights can also send messages to the control unit at well-determined moments. For example, the street lights may transmit to the control unit data concerning servicing. Thus, a street light having a defective lamp can send a message to signal that failure. These two types of messages, and in particular those sent by the street lights, have a nominal power $U_n$ upon being sent.

FIG. 2 shows an exemplary format for a message that is sent from a sending equipment unit to a receiving equipment unit. First, the message carries a start bit START which serves to synchronize the clock of the receiving equipment unit with the received message. Then, there are two useful data words DATA1 and DATA2, each of which is eight bits (i.e., one byte) long in this illustrative embodiment. For example, the first data word DATA1 can contain a sending equipment unit identifier and/or a receiving equipment unit identifier, and the second data word DATA2 can contain the transmitted data itself. Following the data words DATA1 and DATA2, the message has an information word INFO (e.g., three bits long) whose value serves to indicate if and/or how many times the message-bearing signal has been amplified between its being sent by the sending equipment unit and its being received by the receiving equipment unit.

The message further includes a check bit CHECK such as a parity check bit, and an end-of-transmission bit STOP that indicates the end of the message. The use of service bits such as the START, CHECK and STOP bits to frame the useful data words DATA1 and DATA2 is conventional classical in digital transmissions. However, in accordance with a preferred embodiment of the present invention, the information word INFO is present in the message to fulfill the function described above. In this exemplary embodiment, the information word INFO is coded on three bits to make it possible to indicate a maximum of eight amplifications of the signal carrying a message. Nevertheless, in further embodiments, a smaller number of bits may be sufficient or a greater number of bits may be necessary depending on the particular application.

FIG. 3 is a graph illustrating a first embodiment of a communication method according to the present invention. In the graph, the x-axis indicates the distance 1 between the equipment units E1–E6 and CU when following a path along the linking means LT (FIG. 1) connecting these equipment units. The y-axis shows the power level P of a signal sent along the linking means LT. In the example of FIG. 3, a message is sent by equipment unit E3 to the control center CU at a given moment as a signal that passes successively through equipment units E2, E1 and E6 before reaching the receiving equipment unit CU. When it is sent by the sending equipment unit E3, the message includes an information word INFO having a zero binary value 000. In other words, the information word INFO of a message is initially set to a zero value.

The binary message modulates a high frequency signal (i.e., a carrier) which, upon sending, has a nominal power level $U_n$. The transmission is preferably effected by frequency modulation. Each equipment unit through which the signal transits has a receiver for receiving the signal sent by the sending equipment unit (with a nominal power $U_n$), a measurement circuit for measuring data representative of the quality of the received signal, a comparison circuit for comparing that data with a threshold S1, a modification circuit for selectively modifying the message in order to indicate if an amplification of the signal is being performed, an amplifier for amplifying the signal such that its power is once again equal to $U_n$ when the measured data is below the threshold, and a transmitter for sending the message to the receiving equipment unit.

In the preferred embodiment, the data that is measured is simply the power level of the received signal (i.e., the power level of the carrier). This is because the higher the power level of the signal received by a receiving equipment unit, the lower the risk that the signal has been corrupted during transmission to that equipment unit. Thus, the power level is representative of the quality of the signal in the sense defined above. In further embodiments, the signal-to-noise ratio of the signal power level to noise power level or the error rate of the transmitted data is measured. (For an error rate measurement, reference data known to the equipment units must be sent.) In each embodiment, the equipment unit includes the measurement circuit required to perform the desired measurement. Because such measurement circuits themselves are conventional circuits, they shall not be described in detail.

In an equipment unit according to a preferred embodiment of the present invention, the measurement circuit and the comparison circuit are formed by a circuit that includes an amplifier whose output is saturable (i.e., it stays at a maximum value instead of linearly amplifying the input signal) as a function of the received signal power level, followed by a comparator, as shown in FIG. 5. The amplifier is formed by a first operational amplifier 10 connected as an inverter amplifier with two resistors R1 and R2, and the non-inverting input of the operational amplifier being connected to ground. The voltage gain Gv of such an amplifier is R2/R1. The output of this amplifier saturates at a determined value Vsat when the output reaches the value of the positive power supply voltage of the operational amplifier 10.

The comparator is formed by a second operational amplifier 20 whose output is coupled to its inverting input through a resistor R3 to allow a hysteresis to be introduced, and whose non-inverting input receives a reference voltage Vref. The inverting input of the second operational amplifier 20 is connected to the output of the first operational amplifier 10, and its output delivers a signal Vout which takes on a positive or zero value depending on the sign of the voltage Gv×Vin−Vref. The value of the reference signal Vref is lower than the saturation voltage Vsat of the amplifier. During operation, the first operational amplifier 10 receives as an input the signal that is received by the equipment unit (i.e., the modulated carrier Vin). Depending on the particular application, the received signal can be pre-filtered using a passband filter and amplified with a predetermined (and known) gain before being supplied to the input of the operational amplifier.

FIG. 6a is a timing diagram of the signal Gv×Vin at the output of the amplifier when it is saturated. This is the case when the received signal has a power level that exceeds the threshold S1. In this case, the output signal Vout of the comparator is constant and has a zero value, as shown in the timing diagram of FIG. 6b. FIG. 7a is a timing diagram of the signal Gv×Vin at the output of the amplifier when the it is not saturated. This is the case when the received signal has a power level below the threshold S1. In this case, the output signal Vout of the comparator oscillates between a zero value and a positive value, as shown in the timing diagram of FIG. 7b. The gain Gv of the amplifier is set so as to make theses two cases easily distinguishable, bearing in mind the chosen value of the threshold S1.

The ratio of the time during which the output signal Vout of the comparator has a zero value to the time during which it has a positive value varies as a function of the separation between the reference voltage Vref and the dc component of the input signal Vin. In other words, the higher the dc component of the input signal Vin, the lower the width of the steps in the output signal Vout of the comparator, for a constant period. Thus, the duty ratio of the output signal Vout of the comparator decreases as the dc component of the input signal Vin increases.

Thus, the output signal Vout of the comparator can be utilized because if it exhibits voltage steps, then the power level of the signal received by the equipment unit is below the threshold S1 meaning that the signal must be amplified. Additionally, the duty ratio of the output signal Vout of the comparator gives a quantitative indication of the power level of the received signal when it is less than the threshold S1. This quantitative indication can advantageously be exploited in the equipment unit in an appropriate manner.

In an equipment unit according to a second embodiment of the present invention, the measurement circuit includes digital means for measuring the duration of the pulses delivered at the output of a clock restoration circuit. Such a circuit is supplied with the signal received by the equipment unit after demodulation, and generates square wave pulses in phase with the oscillations of that signal. Thus, the circuit is essentially a comparator circuit. The rising edges of the square wave pulses are used to restore the clock of the received signal. The digital means measures the duration of these pulses using a counter that starts on the rising edges of these pulses and stops on their falling edges. The higher the final value of the counter, the higher the power level of the received signal. In other words, the count value is compared with a predetermined reference value, bearing in mind the value chosen for the threshold S1. If the final count value is below the reference value, then the power level of the received signal is below the threshold SI and consequently the signal must be amplified.

In the example of FIG. 3, the power P of the signal sent along the linking means decreases exponentially as a function of the distance 1, starting from the nominal power level $U_n$. At equipment unit E2, the measured power of the received signal remains above the threshold S1, so the signal is not amplified by equipment unit E2. In other words, the signal is transmitted from equipment unit E2 without being amplified. Therefore, the power of the signal does not increase at equipment unit E2 and the message being carried is not modified.

On the other hand, the power P is below the threshold S1 at equipment unit E1. Thus, the signal received by this equipment unit is amplified before being transmitted to the control unit CU (via equipment unit E6). The power P of the signal then returns to the nominal power value $U_n$ of equipment unit E1. Before being transmitted as an amplified signal, the message is modified at equipment unit E1 so as to indicate that an amplification has taken place. This is achieved by incrementing the value of the information word INFO by one unit, or to 001 in binary notation.

A similar amplification takes place at equipment unit E6, and the message is again modified to indicate that another amplification has been performed by that equipment unit. In particular, the value of the information word INFO is again incremented by one unit so as to become 010 in binary notation. After amplification, the signal is sent with a power level that is once again equal to the nominal power value $U_n$. The signal is then received by the control unit CU. When the signal is received, the control unit CU extracts the message by demodulating the received signal and processes the value of the information word INFO to indicate whether the message may have been corrupted.

Thus, when received by the control unit, the message carries an indication of whether a signal amplification took place after it was sent by the sending equipment unit. Such an indication also indirectly indicates that the message may have been corrupted (i.e., that it may be error-ridden). The higher the value of the information word INFO, the greater the risk that the message has been corrupted. Thus, beyond a certain value, the control unit CU may disregard the received message. However, because the message has been received (albeit in a corrupted state), the control unit knows that equipment unit E3 has attempted to send a message and can later request for equipment unit E3 to re-send that message, preferably at a time when the attenuation of the linking means has decreased.

In general, the control unit can handle the indication of a corrupted message in any appropriate manner. For example, in one case, the control unit sends a request to the sending equipment unit for a re-sending of the message at a later moment. Alternatively, the control unit can withhold the usual message acknowledging the received message, so that the sending equipment unit re-sends the message at a later time on its own initiative. Advantageously, the sending conditions on the linking means may have improved in the time interval that lapses between the two transmissions of a message (in particular, the attenuation by the linking means could have diminished). Thus, the re-sent signal may not need to be amplified, or may need to be amplified less often, so that the risk of message corruption is smaller.

In one embodiment of the present invention, the message is also modified to indicate the threshold value S1 that was used by the intermediate equipment unit that amplified the signal and/or to identify that intermediate equipment unit. This information is added by inserting additional words to a message before the message is sent by the intermediate equipment unit. For example, to identify the intermediate equipment unit, a word containing the identification number for the intermediate equipment unit is added to the message.

FIG. 4 illustrates a second embodiment of the communication method of the present invention. In this embodiment, the data representative of the quality of the received signal (i.e., the power P of the received signal in the illustrated example) is compared to a second threshold S2, which is less than the first threshold value S1. Depending on the result of the comparison with the first and second thresholds S1 and S2, the signal may or may not be amplified and may or may not be sent. More specifically, three different cases can occur.

First, if the data is greater than the first threshold S1 (i.e., if P>S1), the signal is sent to the receiving equipment unit without being amplified and without modifying the message. If the data is between the second threshold S2 and the first threshold S1 (i.e., if S2<P<S1), the signal is amplified and sent to the receiving equipment unit after modification of the message to indicate that an amplification has taken place. If the data is less than the second threshold S2 (i.e., if P<S2), then the signal is not sent. It is preferable under certain circumstances for the receiving unit to not receive any message rather than to receive a message that is highly corrupted. The last case makes it possible to prevent a signal that is too weak, and therefore carrying a message that is strongly corrupted by noise, from reaching the receiving equipment unit.

The embodiments of the present invention described above are non-limiting exemplary embodiments. The present invention can be applied to all types of networks (standardized or non-standardized, and arranged in a ring, star or other configuration). While the present invention is particularly suited to non-standardized networks, it is also applicable to standardized networks. Likewise, the present invention can be used with equipment of any nature and with any type of linking means (optical fibers, coaxial cables, radio-frequency electromagnetic links, microwave links, optical links, or the like). Moreover, the term "equipment" is meant in its broadest sense. In particular, an "equipment unit" can be an item of functional equipment (i.e., with a determined function in a given application such as a street light) or merely a relay or repeater that is arranged in the network to break up an excessive separation between two items of functional equipment.

While there has been illustrated and described what are presently considered to be the preferred embodiments of the present invention, it will be understood by those skilled in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for communicating on an equipment network through linking means, the equipment network including a plurality of equipment units, and at least some of the equipment units being able to send and/or receive messages, said method comprising the steps of:

sending a message from a sending one of the equipment units to a receiving one of the equipment units as a signal having a nominal power; and whenever the signal is amplified by an intermediate one of the equipment units through which the signal passes, modifying the message to indicate that the signal has been amplified by the intermediate equipment unit.

2. The method as defined in claim 1, wherein in the step of modifying the message, the value of an information word of the message is incremented.

3. The method as defined in claim 1, wherein in the step of modifying the message, the message is also modified to identify the intermediate equipment unit that amplified the signal.

4. A method for communicating on an equipment network through linking means, the equipment network including a sending equipment unit, a receiving equipment unit, and at least one intermediate equipment unit located on the network between the sending and receiving equipment units, said method comprising the steps of:

sending a message from the sending equipment unit to the receiving equipment unit as a signal having a nominal power level;

receiving the signal at the intermediate equipment unit;

measuring data representative of the quality of the received signal and comparing the measured data with at least a first threshold;

if the measured data is less than the first threshold, amplifying the signal and modifying the message to indicate that an amplification has been performed; and sending the signal from the intermediate equipment unit to the receiving equipment unit.

5. The method as defined in claim 4, wherein the step of amplifying the signal and modifying the message includes the sub-step of incrementing the value of an information word contained in the message.

6. The method as defined in claim 5, wherein the step of amplifying the signal and modifying the message also includes the substep of modifying the message to identify the intermediate equipment unit that amplified the signal.

7. The method as defined in claim 4, further comprising the steps of:

comparing the data representative of the quality of the received signal to a second threshold; and if the measured data is less than the second threshold, not performing the step of sending the signal from the intermediate equipment unit to the receiving equipment unit.

8. The method as defined in claim 4, wherein the data representative of the quality of the received signal is the power level of the received signal.

9. The method as defined in claim 4, wherein the data representative of the quality of the received signal is either a ratio of the power level of the received signal to the noise power level, or an error rate for transmitted data.

10. A machine-readable medium encoded with a program for communicating on an equipment network through linking means, the equipment network including a sending equipment unit, a receiving equipment unit, and at least one intermediate equipment unit located on the network between the sending and receiving equipment units, said program containing instructions for performing the steps of:

sending a message from the sending equipment unit to the receiving equipment unit as a signal having a nominal power level;

receiving the signal at the intermediate equipment unit;

measuring data representative of the quality of the received signal and comparing the measured data with at least a first threshold;

if the measured data is less than the first threshold, amplifying the signal and modifying the message to indicate that an amplification has been performed; and sending the signal from the intermediate equipment unit to the receiving equipment unit.

11. The machine-readable medium as defined in claim 10, wherein the step of amplifying the signal and modifying the message includes the sub-step of incrementing the value of an information word contained in the message.

12. The machine-readable medium as defined in claim 11, wherein the step of amplifying the signal and modifying the message also includes the sub-step of modifying the message to identify the intermediate equipment unit that amplified the signal.

13. The machine-readable medium as defined in claim 10, wherein said program further contains instructions for performing the steps of:

comparing the data representative of the quality of the received signal to a second threshold; and if the measured data is less than the second threshold, not performing the step of sending the signal from the intermediate equipment unit to the receiving equipment unit.

14. The machine-readable medium as defined in claim 10, wherein the data representative of the quality of the received signal is one of the power level of the received signal, a ratio of the power level of the received signal to the noise power level, and an error rate for transmitted data.

15. A first equipment unit for connection to an equipment network, the equipment network connecting the first equipment unit and a plurality of other equipment units through linking means, said first equipment unit comprising:

a receiver for receiving a signal that was sent by a sending one of the equipment units at a nominal power level;

means for measuring data representative of a quality of the received signal;

means for comparing the measured data with a first threshold;

means for amplifying the signal when the measured data is below the first threshold;

means for modifying a message carried by the signal so as to indicate that the signal has been amplified whenever the signal is amplified by the means for amplifying; and a transmitter for sending the signal on to a receiving one of the equipment units.

16. The first equipment unit as defined in claim 15, wherein the means for modifying increments the value of an information word contained in the message.

17. The first equipment unit as defined in claim 16, wherein the means for modifying modifies the message so as to identify that the first equipment unit is the equipment unit that amplified the signal.

18. The first equipment unit as defined in claim 15, wherein the means for comparing also compares the measured data with a second threshold, and the transmitter does not send the signal on to the receiving one of the equipment units when the measured data is below the second threshold.

19. A message sent as a signal from a sending equipment unit of an equipment network to a receiving equipment unit of the equipment network, said message comprising:

an information word having a value that indicates the number of times that the signal has been amplified by intermediate equipment units located on the network between the sending equipment unit and the receiving equipment unit.

20. The message as defined in claim 19, further comprising at least one word that identifies which intermediate equipment units have amplified the signal.

21. The message as defined in claim 19, further comprising at least one word that identifies threshold levels used by intermediate equipment units that have amplified the signal.

* * * * *